(12) United States Patent
Sintorn et al.

(10) Patent No.: US 12,397,874 B2
(45) Date of Patent: *Aug. 26, 2025

(54) SUSPENSION SYSTEM

(71) Applicant: Ohlins Racing AB, Upplands Väsby (SE)

(72) Inventors: Torkel Sintorn, Vaxholm (SE); Erik Waltersson, Upplands Väsby (SE)

(73) Assignee: ÖHLINS RACING AB, Upplands Väsby (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,890

(22) Filed: Apr. 10, 2024

(65) Prior Publication Data

US 2024/0253728 A1    Aug. 1, 2024

Related U.S. Application Data

(63) Continuation of application No. 17/259,752, filed as application No. PCT/EP2019/068879 on Jul. 12, 2019, now Pat. No. 11,981,392.

(30) Foreign Application Priority Data

Jul. 13, 2018 (EP) ..................................... 18183419

(51) Int. Cl.
    B62K 25/04    (2006.01)
    B62J 1/08    (2006.01)
    (Continued)

(52) U.S. Cl.
    CPC ................. B62K 25/04 (2013.01); B62J 1/08 (2013.01); B62K 25/08 (2013.01); B62K 25/286 (2013.01);
    (Continued)

(58) Field of Classification Search
    CPC ...... B62K 25/04; B62K 25/08; B62K 25/286; B62K 2025/044; B62K 2025/045;
    (Continued)

(56) References Cited

U.S. PATENT DOCUMENTS

2001/0030408 A1    10/2001  Miyoshi
2004/0222056 A1    11/2004  Fox
(Continued)

FOREIGN PATENT DOCUMENTS

EP    1241087 A1    9/2002
EP    2505478 A1    3/2012
(Continued)

Primary Examiner — Alan D Hutchinson
(74) Attorney, Agent, or Firm — Kagan Binder, PLLC

(57) ABSTRACT

The present disclosure relates to a system for control of front and/or rear suspensions of a bicycle. The system comprises at least one sensor and one control unit. The at least one sensor is connected to the control unit and the control unit is configured to receive information from the sensor, determine a ride state of the bicycle from the information and send a suspension setting signal to the front and/or the rear suspension corresponding to the ride state. The control unit is further configured to establish an event, the event comprising information about said ride state of the bicycle and a suspension setting signal to the front and/or the rear suspension corresponding to the ride state and defining a minimum duration in time for the event.

15 Claims, 2 Drawing Sheets

(51) Int. Cl.
*B62K 25/08* (2006.01)
*B62K 25/28* (2006.01)

(52) U.S. Cl.
CPC ... *B62J 2001/085* (2013.01); *B62K 2025/044* (2013.01); *B62K 2025/045* (2013.01); *B62K 2025/047* (2013.01)

(58) Field of Classification Search
CPC ...... B62K 2025/047; B62K 25/00; B62J 1/08; B62J 2001/085; B60G 2300/12; B60G 2400/10; B60G 2400/204; B60G 2401/16; B60G 2401/17; B60G 2401/28; B60G 2500/10; B60G 2600/02; B60G 17/016; B60G 17/06
See application file for complete search history.

(56) References Cited

U.S. PATENT DOCUMENTS

| | | |
|---|---|---|
| 2015/0061241 A1 | 3/2015 | Walthert et al. |
| 2018/0037294 A1 | 2/2018 | Kurotobi et al. |
| 2018/0334212 A1 | 11/2018 | Bowers et al. |

FOREIGN PATENT DOCUMENTS

| | | |
|---|---|---|
| EP | 2492179 A1 | 8/2012 |
| EP | 3095681 A1 | 11/2016 |
| GB | 2554864 A | 4/2016 |

SUSPENSION SYSTEM

CROSS-REFERENCE TO RELATED APPLICATIONS

This application is a continuation of and claims priority to U.S. patent application Ser. No. 17/259,752 filed on Jan. 12, 2021, which is a national stage of, and claims priority to, Patent Cooperation Treaty Application No. PCT/EP2019/068879, filed on Jul. 12, 2019, which application claims priority to European Patent No. EP 18183419.3, filed Jul. 13, 2018, all of which applications are hereby incorporated herein by reference in their entireties.

FIELD

The present specification generally relates to the field of systems for controlling suspensions and in particularly discloses a system for controlling suspension systems for a bicycle.

BACKGROUND

Shock absorbers and damping systems are used for damping of the relative movement between the wheel and the chassis of a vehicle, such as a car, a motorcycle or a bicycle. Conventionally, bicycles are provided with a shock absorbing fork and sometimes also a shock absorbing rear wheel suspension. Up until recently these suspension systems were all passive systems which could be adjusted for example regarding spring pre-load, compression damping or rebound damping. Bicycles, and especially mountain bikes, are subject to exceedingly varying ride conditions. The conditions range from easy pedaling or coasting on flat and even tarmac to hard pushing up and down steep and technically challenging ascents and descents. As such, it is hard to find a good compromise in terms of a suspension setup that can handle such different ride conditions in a satisfactory manner. Previously known solutions comprise suspension systems with mechanical and/or electrical lock-out. In these systems, the suspension may be switched between two extreme first and second positions. In the first, open position the suspension can work freely and along the entire stroke and in the second position, the suspension is more or less completely locked and prevented from moving. The first position is for example preferable when going downhill steep and technical downhills where comfort, grip and suspension performance is required. The second position on the other hand, is often preferred when pedaling along flat and smooth surfaces, such as tarmac where pedaling efficiency is required. However, these requirements change quickly and riders don't always remember to switch between the two suspension set ups and do also not always have time to do so since riding the bike requires their full attention. Also, having two extreme positions (fully open or fully locked), does not always provide the required amount of versatility and performance. In certain situations, the rider would for example benefit from suspension adjustments lying somewhere between the two extreme positions.

DETAILED DESCRIPTION

The disclosure provides an improved system to control a front and a rear suspension of a bicycle. The disclosure is based on the realization that a ride can be divided into consecutive events. Each event comprises information about a ride state of the bicycle and a suspension setting signal to the front and/or the rear suspension corresponding to this ride state and wherein each event has a defined minimum duration in time. A control unit is connected to one or more sensors which provide the control unit with information and the ride state is determined by the control unit based on the information provided by the sensor or sensors and the control unit is configured to send a suspension setting signal to the front and/or the rear suspension corresponding to said ride state and also to define a duration in time of the event, i.e. how long is it going to be until the procedure is repeated. Hereby, a system is achieved which is able to continuously adapt the suspension set-up to current riding conditions in a performance optimized manner while at the same time being capable of doing so with a limited power consumption. Since electronical systems on a bicycle normally will have to use batteries as power source, power consumption is an issue that should not be underestimated. Of course, other power sources, such as dynamos or other types of generators, are conceivable but in reality, batteries are and probably will be the most practical solution in most cases. By configuring the system to establish discrete events having a certain minimum duration in time, it is possible to reduce power consumption. This since power consuming steps such as computation, sending of suspension setting signals and energizing of actuators of the adjustable features of the suspension need only occur once during each event. For the rest of the time of each event, the system may idle, or otherwise be put into a power saving mode, thus saving energy and prolonging battery life. In comparison with a system which constantly evaluates sensor input and sends out suspension setting signals in response to such sensor input, considerable power saving is achieved with a system according to the present disclosure, thus achieving longer battery life and/or reducing required battery size and weight. At the same time, it has surprisingly been established that even though the system of the present disclosure does not constantly react to the current ride situation, which may be seen as the way to go when creating an active suspension system, the performance, both perceived and measured, of the suspension does not suffer, or at least only to a negligible amount, from this creation of events having a minimum duration in time.

BRIEF DESCRIPTION OF THE DRAWINGS

The disclosure will be understood through the following illustrative and non-limiting detailed description of preferred examples, with reference to the appended drawing, on which.

Figure 1:
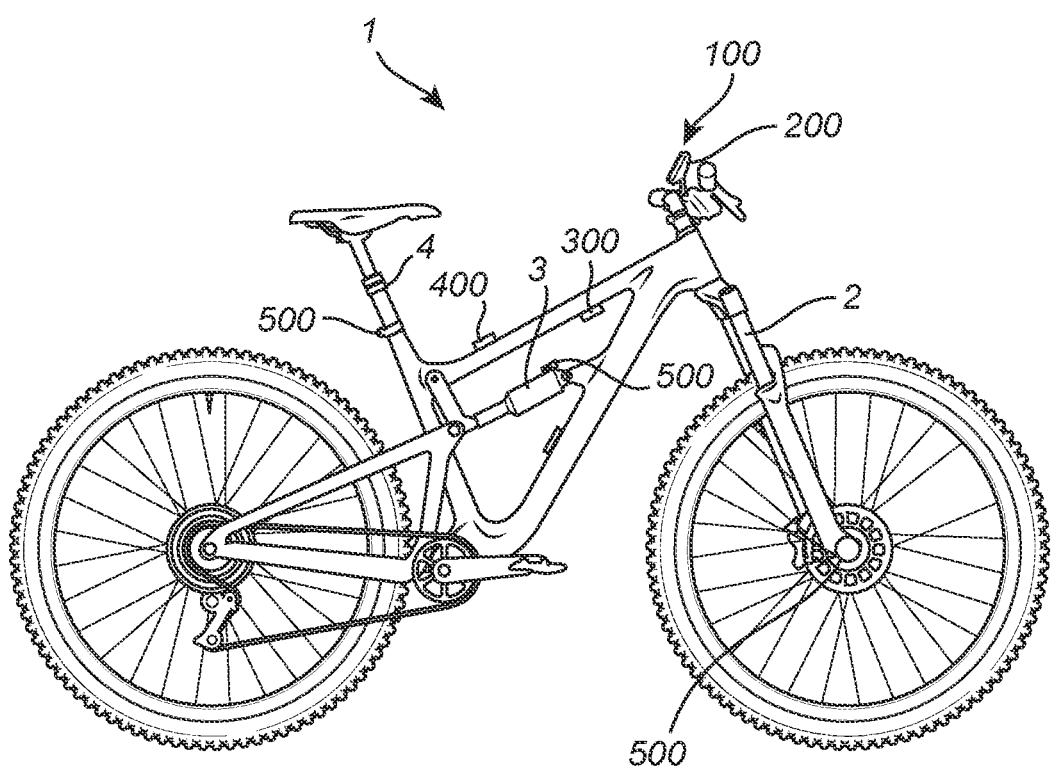
FIG. 1 shows a side view of a full suspension mountain bike to which a system according to an example of the present disclosure has been mounted.

According to a first aspect of the disclosure, a system for control of front and rear suspensions of a bicycle is provided. The system comprises at least one sensor and at least one control unit, wherein the at least one sensor is connected to the control unit. The control unit is configured to receive information from the sensor; determine a ride state of the bicycle from the information; and send a suspension setting signal to the front and/or the rear suspension corresponding to the ride state. The control unit is further configured to establish an event comprising information about the ride state of the bicycle and a suspension setting signal to the front and/or the rear suspension corresponding to the determined ride state, wherein this event has a defined minimum duration in time.

Hereby, as implied above, a system is provided that can adapt suspension performance to the current situation, i.e. ride state, with a high degree of precision while still maintaining acceptable, or even good or very good, power consumption, thus prolonging battery life and/or reducing battery size. The system can provide a suspension with much higher performance than previously known lock-out systems while maintaining low power consumption.

Further, since the system of the present disclosure is not limited to only adjust compression damping, which is normally the case in the previously known lock-out systems, all, or at least most, parameters of a bicycle suspension may be adjustable by means of the present system. For example, high and low speed compression damping, high and low speed rebound damping, ride height, spring preload, spring rate, bleed valve adjustment, blow-off, etc.

According to one example, the minimum duration is at least 0.1 second. Even a duration as short as 0.1 second is enough to create substantial power savings while ensuring that the bicycle suspension will perform at a highest level.

According to one example, the minimum duration is at least 0.2 second.

According to one example, the minimum duration is at least 0.5 second.

According to one example, the minimum duration is at least 1 second.

According to one example, said information about said ride state comprises one or a combination of more than one ride modes.

According to one example, said information about said ride state further comprises one or a combination of more than one rider selections.

According to one example, the control unit sends out the suspension setting signal once during an event. This ensures low power consumption.

According to one example, the system further comprises at least one actuator for adjusting a setting of the front suspension and/or the rear suspension and/or a seat post or other parts of a suspension.

According to one example, the at least one actuator for adjusting a setting of the front suspension and/or the rear suspension is capable of maintaining its position in a non-energized state. This means that the actuator contributes to keeping power consumption down since it need not be energized in order to maintain its position.

According to one example, the sensor includes an Inertial Measurement Unit (IMU). Such units are reliable, inexpensive and of low power consumption.

According to one example, the IMU comprises at least one of an accelerometer, a gyroscope and a magnetometer.

According to one example, the system further comprises a Human Machine Interface (HMI) connected to said control unit. An HMI can be interactive and be used to make adjustments of settings and parameters of the system and to present information to a user such as a current ride state; current preset event length; set-up parameters; etc. etc.

According to one example, the HMI comprises a display, such as a touch screen.

According to a second aspect of the disclosure, there is provided a bicycle suspension comprising front and/or rear shock absorbers and a system as previously described. The advantages and benefits of such suspension correspond to those of the previously described system.

According to one example of the second aspect of the disclosure, the shock absorbers comprise at least one actuator for adjusting a setting of the front suspension and/or the rear suspension.

According to one example of the second aspect of the disclosure, the actuator is only energized during a change of setting of the front suspension and/or the rear suspension and wherein said actuator is arranged to maintain its position in a non-energized state. This ensures low power consumption. It also ensures that the suspension can be placed and maintained in a predefined set-up when e.g. battery voltage falls below a predefined threshold. Thus, if a rider comes to a point where the voltage of the battery of the system falls below a certain value, for whatever reason (rider forgets to charge in time, battery becomes defect, etc.), the control unit can be programmed to put the suspension in a predefined position corresponding to a good compromise which will allow the rider to continue riding without too much hassle until the battery can be recharged or replaced. This is made possible by the fact that the actuators will maintain any given position also in a non-energized state.

According to a third aspect of the disclosure, there is provided a method for controlling a bicycle suspension, including
  providing at least one sensor and one control unit, wherein the at least one sensor is connected to the control unit;
  the control unit is receiving information from the sensor;
  the control unit determines a ride state of the bicycle from the information;
  the control unit sends a suspension setting signal to the front and/or the rear suspension corresponding to the ride state;
  wherein the control unit establishes an event, the event comprising information about the ride state of the bicycle and a suspension setting signal to the front and/or the rear suspension based on the information from the sensor, and wherein the control unit defines a minimum duration in time for the event.

According to one example of the third aspect of the disclosure, said duration is at least 0.1 seconds.

According to one example of the third aspect of the disclosure, said information about said ride state comprises one or a combination of more than one ride modes.

All figures are schematic, not necessarily to scale, and generally only show parts which are necessary in order to elucidate the disclosure, wherein other parts may be omitted or merely suggested. Throughout the figures the same reference signs designate the same, or essentially the same features.

Further, although the figures all include a bicycle having both front and rear suspension, it would be possible to carry out the disclosure with only front or rear suspension as well. In cross country racing for example, many riders still prefer to ride with front suspension only, mainly since they value low bike weight higher than having a rear suspension. The advantages of the present disclosure apply just as well on such single suspension bikes as on a full suspension bike. It may also be possible to apply the disclosure to other parts of a bicycle, such as a suspended steering bar or a suspended or moveable seat post. Further, even though the examples disclose front forks having two legs, it is also conceivable to have a front with only a single leg or more than two legs.

Figure 2:
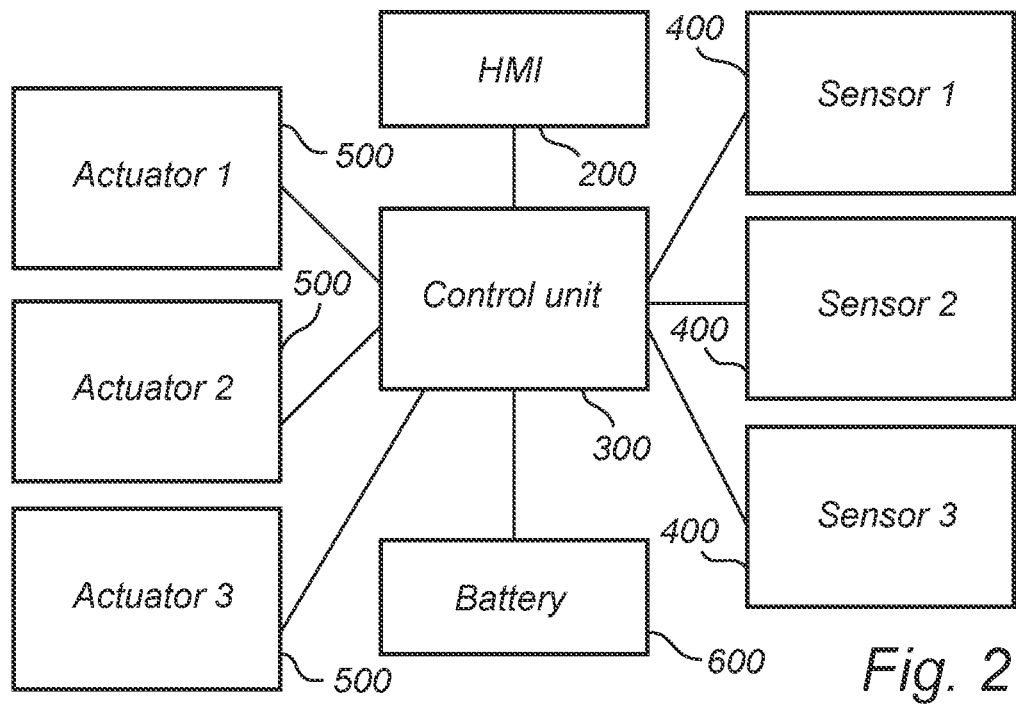
FIG. 2 shows a schematic representation system in accordance with an example of the present disclosure.

FIGS. 1 and 2 illustrate a bicycle 1 and a system having a front suspension in the form of a front fork 2 and a rear suspension having a shock absorber 3. The bicycle 1 is further equipped with a suspension control system 100 comprising a Human Machine Interface (HMI), here shown to comprise a display 200. The suspension control system 100 further comprises a control unit 300 and at least one sensor arrangement 400. The suspension control system 100 also comprises one or more actuators 500 arranged at for example the front fork 2, the rear shock absorber 3 and/or the seat post 4. Further, a battery 600 is indicated in the figures. In the example of FIG. 1, only one sensor arrangement 400 is described, it is however possible to equip the suspension control system 100 with additional sensor arrangements if deemed necessary. It has, however, surprisingly been determined by the applicant that for most situations it is fully adequate to use a single Inertial Measurement Unit (IMU) arranged at the main frame of the bicycle. An IMU typically uses linear accelerometers and gyros, often one each is used for each of the vehicle axes (pitch, roll and yaw). A magnetometer can also be added to the IMU, possibly one per axis. The IMU delivers signals to the control unit 300 which processes the delivered signals and is configured to establish and differentiate between different ride states. Each such ride state comprises one or a combination of ride modes. Examples of such ride modes will be described in the following. A first mode to be considered can be to consider whether or not a bicycle is ascending and if so, how steep is the ascent. This is of utmost important when setting up the suspension. It may for example be necessary to lock parts of the suspension and/or reduce ride height of a front suspension when going up a steep ascent. In order to make optimal suspension settings, ascent can be subdivided into low; moderate; and steep ascents. Similarly, establishing that a vehicle is descending is equally important and descending can also be subdivided into low, moderate and steep. In general, subdivisions of ride modes can be applied as found necessary, depending on how fine subdivisions one requires. For example, it can sometimes be sufficient to merely establish that a vehicle is ascending or descending, not how steep it is. In other situations, a more finely tuned subdivision may be necessary. This applies to all ride modes. Similarly, it is possible and relevant to determine whether or not there is an incline at all or if the ground is level. Further, it is possible with the present disclosure to determine whether the rider is coasting, i.e. not pedaling at all or if, pedaling takes place, if this is done at an easy, medium or high intensity and at which cadence this is done. Examples of high intensity pedaling with high cadence is for example a finish sprint and a high intensity event with low cadence may for example be pushing hard up a very steep hill or other obstacle. Information regarding these different types of pedaling, or coasting, is important when determining a suitable suspension set up for a specific event. In some situations, a locked suspension may be preferred, e.g. a finish sprint on level, even ground, whereas other situations, e.g. pushing up a steep obstacle may require plush setting of rear suspension to maintain optimal tire grip. Also, the rider position, i.e. sitting down or standing up can be determined and used in the suspension set up of the present disclosure. The rider's position affects the center of gravity of the vehicle and as such it also affects the required suspension set up. A standing rider have only two interfaces with the bicycle, handles and pedals, whereas a sitting rider also uses the saddle as an interface. This also requires different properties from the suspension, in addition to the center of gravity movement. Another ride mode is the nature of the ground on which the bicycle is moving. An entirely even ground can often allow locked out suspension, thereby minimizing pedaling efficiency losses whereas more technical ground requires working suspension. It is possible to differentiate on exactly how technical the ground is in a suitable number of sublevels, i.e. non-technical; less technical; technical; very technical; extremely technical, as required and preferred. It is also possible to add another sub-category, namely that there is no ground at all on which the bicycle is riding, meaning that the bicycle for example has hit a jump and is currently in the air. When this mode is detected, the system will prepare the bicycle for the often rather heavy impact that occurs when the bicycle hits the ground again. The impact as such is also a mode that the system of the present disclosure can detect and use when setting up the suspension. It is possible to for example differentiate between no impact; low impact; moderate impact; high impact, and; extreme impact. Speed can also be monitored and used as a ride mode and can be detected by measuring the rpm of either a front and/or a rear wheel or by using e.g. a GPS-system. The acceleration of the bicycle is also measured, preferably but not necessarily, along all three axes. This makes it e.g. possible to determine the position of the bicycle and take necessary action. For example, a forward tilted bike mid-air will probably require a rather stiff front fork set-up to accommodate an upcoming front wheel landing. The seat position, if using an adjustable seat post, can also be monitored. This since it will affect center of gravity and it is also possible to dedicate certain suspension set-ups to the different seat positions. For example, a maximally lowered seat position is often used for aggressive downhill riding and as such suitable suspension set-up can be coupled to such seat position. Also, front and/or rear gear selection can be monitored and used as a ride mode. As mentioned elsewhere, it is also possible to have one or more user definable selections in the system. Such selection could affect one or more parameters of the suspension set-up. For example, a user selection that indicates that the rider is going for a training ride may imply that longer minimum event durations are acceptable in order to obtain correspondingly longer battery lifetime. The opposite would be a user selection that indicates that the rider is going to compete in a race and in such case, shorter minimum duration providing maximum performance is more important than battery lifetime.

It is understood that all ride modes are not necessarily required and that they can be combined as found useful in each system and for different situations.

As can be seen, the control unit is configured to draw a number of conclusions from the input from the sensor/s sensors and user selections and establish ride modes based on this input. These ride modes are then combined into a current ride state, e.g. pedaling hard on a moderately steep but technical descent. Each such ride state can be assigned a certain, optimized suspension setup with corresponding signals being sent to the suspension parts, e.g. front fork and/or rear shock absorber, as well as a duration in time. This combination of ride state; suspension setup; and duration in time is defined as an event. This has been found to amount to a very good compromise between suspension performance and battery life which none of the previously known systems have been capable of. At the end of each event, the control unit starts from the beginning again by assessing sensor input, user selections and defines again a ride state and a duration in time, thus creating a new event. It is of course also conceivable within the scope of the disclosure that a ride state only comprises one ride mode and not always a plurality thereof.

It is possible to have a same duration of time for each of the different events but it is also possible, and sometimes preferable, to define different durations for different types of events. For example, if it has been established that a rider pedals slowly and easy along a level, even surface, it is likely acceptable to use a longer duration in time to be able to save battery. On the other hand, if it is established that a rider has selected "Race" and that the bicycle is coasting down a steep, extremely technical descent, it is preferable to use shortest possible duration in time since suspension performance is probably more relevant than battery life. It is also possible to configure the control unit to take previous events into consideration when determining duration in time. For example, if it is determined that in each of the previous events, the ride modes and thus the ride states have changed considerably, the control unit can be configured to reduce duration in time in order to better adapt to changing conditions. If, on the other hand, each of a number of previous events have had the same, or very similar, ride states, the control unit may be configured to choose longer durations in time. Typical minimum duration time for an event would in the present disclosure be 0.1 seconds whereas maximum duration for an event would be several minutes. Often, 0.2 or 0.5 seconds to 15 seconds are applicable. Another applicable range is 0.5 seconds to 5 seconds. The minimum duration may be fixed or may be determined for each upcoming event, based on for example previous event history.

As can be seen above, the input to the control unit can comprise sensor signals only but can also be combined with user selections. Such selections can be fed to the control unit 300 through a HMI, such as display 200. Typical user selections can be ride types such as "Downhill", "Cross-country", "Commuting" etc. etc. Event types may also be selected and can comprise e.g. "Race", "Race practice", "Training" etc. etc. This user specified information will then be considered by the control unit together with the input from the sensors.

Figure 3:
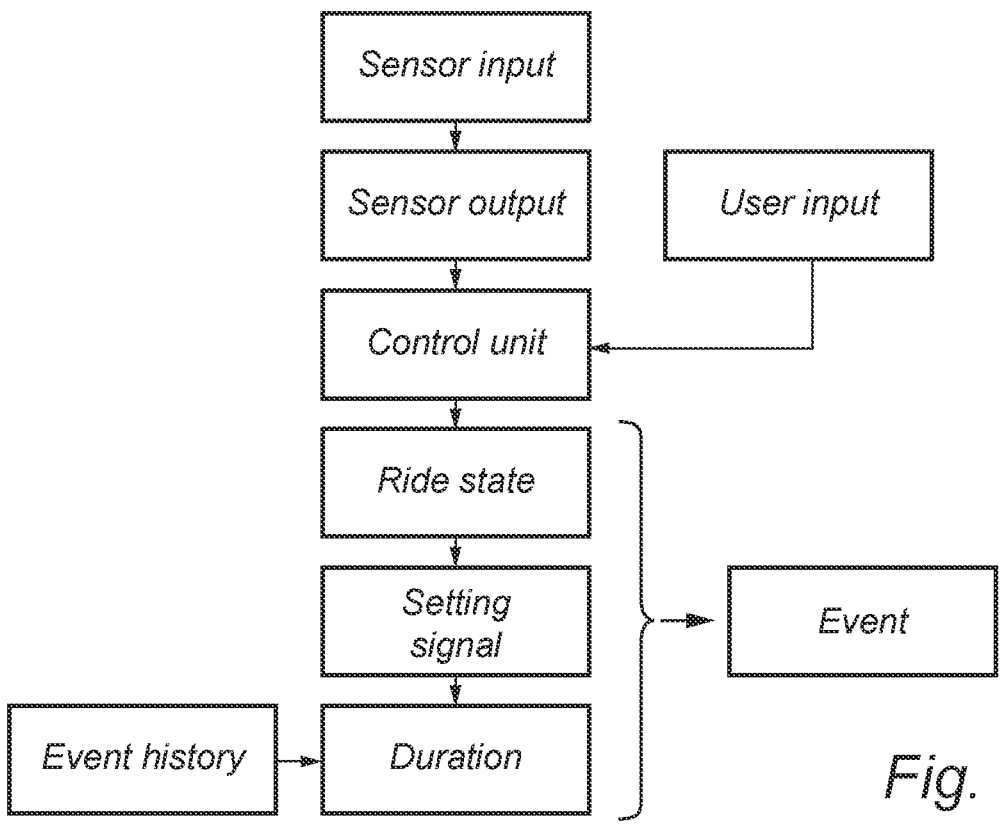
FIG. 3 is a flow chart describing an example of the present disclosure.

In the schematic presentations of FIGS. 2 and 3 the general components are presented. The system comprises a control unit being connected to one or more, or as in this exemplary example three, sensors and at least one actuator, in this exemplary example there are three actuators. In addition, there is an HMI (Human Machine Interface) connected to the control unit. The sensors may each comprise an IMU (Inertial Measuring Unit) comprising for example three accelerometers and three gyros, one for each of the main axes. The actuators may comprise a stepper motor, solenoid, piezo motor or other suitable machinery. Preferably, actuators should be used that do not require power to maintain a given position since this will help in the reduction of power consumption. The HMI can be used as a means of presentation, for example displaying one or more of current ride state; suspension setup; user selections; battery status; speed; inclination; etc. The control unit may further comprise storage capacity for example in the form of RAM and/or ROM, for storing an operation system and also for storing ride information which can be recorded during riding and then be analyzed post-ride. The control unit preferably also comprises an interface for connection to e.g. an external computer such as a laptop or personal computer. This allows for e.g. updating of firmware of the control unit or uploading of pre-defined information relating to specific bicycle brand and models. Or for upload of information stored in the system to an external computer for e.g. post-race analysis. Any suitable interface can be applied, e.g. USB-port, serial port, Bluetooth, Wi-Fi etc., alone or in combination.

In use, the sensors will continuously, or as often as it is required by the current event established by the control unit, sense any movements in any direction of the bicycle and feed the control unit with information about the current state of the bicycle. The control unit is configured to use this information to determine a number of different ride modes. For example, that the bike is going uphill. The control unit may also be configured to determine that the rider is standing up while pedaling or that the rider is sitting down while coasting down a technical descent or that the rider is sprinting down an even, level path etc. etc. All these different ride modes will create certain patterns of movement caused by the underground and/or the rider and they will be detected by the sensor arrangement and established by the algorithms in the control unit. It has been found that many different ride states modes are discernible by a system according to the present disclosure and the control unit is configured to determine these from the continuous sensor output. As soon as the control unit has established one or more current ride modes, these are combined into a ride state and as a response to the determined ride state, the control unit will send out a suspension setting signal which will handle this ride state in an optimized manner. While doing so, a duration in time will be established. This duration in time defines the time until the control unit will again iterate the above described cycle. This combination of established ride state, sending out a suspension setting signal and defining a duration in time is defined as an event in the present disclosure. In one example, the duration in time will be predefined as being the same for all events. In other examples, there are different predetermined durations in time for different ride states which can be looked up in a table. In other examples, the duration in time is calculated independently for each separate event. It is also possible for the control unit to take into consideration the history of what has happened in one or more previous events, thus taking adaptation to current conditions one step further. If for example a certain number of previous ride states have been identical, or at least similar, to the current one, the duration may be set to a longer duration than it would have, had the previous ride states varied considerably. It should be noted that even though the sensors may be continuously outputting information, the control unit will only evaluate information arriving at certain points in time, i.e. as soon as a first event has come to an end, the control unit will again evaluate sensor output, thereby reducing power consumption. It is of course also possible to configure the control unit and the sensor(s) such that the sensors will also work intermittently, i.e. only when required depending on the duration in time of the event in question. This will further reduce power consumption.

A number of modifications of the examples described herein are possible without departing from the scope of the disclosure, which is defined in the appended claims. For example, in an alternative example, it would be possible to connect the seat post to the system as well. Seat posts are often adjustable in height and it would be possible to connect one or more actuators to the control unit such that the seat position could be adjusted depending on the current ride state, e.g. raised or lowered. A battery can be replaced with or at least work together with a dynamo or a regenerative brake system or similar which will prolong battery life and/or reduce required battery size. A central battery may be provided supplying all parts of the system or a plurality of batteries may be provided and even one battery per unit is conceivable, i.e. one battery per sensor; actuator; HMI; control unit etc. This is particularly advantageous in that all wired connections between different parts of the system can be avoided. Further, it is conceivable to leave out the HMI. The system is intended to work independently, without the requirement of an HMI. Such interface will of course increase user interaction by providing information as well as allowing a user to adjust the system. However, the event based suspension system of the present disclosure does not require an HMI per se. In any case, the system can be connected to a personal computer, laptop or similar through a suitable port (USB, serial, wireless or similar) such that the system can be adjusted, modified or updated and for information to be downloaded from the system. The different parts of the system, i.e. sensors, control unit, HMI, actuators may be interconnected by means of wired connections or through wireless connections.

While the disclosure has been illustrated and described in detail in the drawings and foregoing description, such illustration and description are to be considered illustrative or exemplary and not restrictive; the disclosure is not limited to the disclosed examples. It is understood that many modifications, variations and alterations are conceivable within the scope as defined in the appended claims. Additionally, variations to the disclosed examples can be understood and effected from a study of the drawings, the disclosure, and the appended claims.

The invention claimed is:

1. A method for controlling a bicycle suspension, comprising:
   providing at least one sensor arrangement and one control unit, wherein said at least sensor is connected to said control unit;
   receiving information from said sensor to the control unit;
   determining a ride state of the bicycle from said information;
   establishing an event, said event comprising information about said ride state of the bicycle and a suspension setting signal to at least one of a front suspension and a rear suspension based on the information from said sensor,
   defining a minimum duration for said event wherein the minimum duration in time is one of fixed and determined for each event, and
   sending a suspension setting signal to at least one of a front suspension and a rear suspension corresponding to the ride state.

2. The method according to claim 1, wherein said duration is at least 0.1 seconds.

3. The method according to claim 1, wherein said information about said ride state comprises one or a combination of more than one ride modes.

4. The method according to claim 1, wherein the information about the ride state further comprises one or a combination of more than one rider selections.

5. The method according to claim 1, wherein the control unit sends out the suspension setting signal once during an event.

6. The method according to claim 1, further comprising controlling at least one actuator to adjust a setting of at least one of the front suspension and the rear suspension.

7. The method according to claim 6, wherein the at least one actuator for adjusting the setting of at least one of the front suspension and the rear suspension is maintained in its position in anon-energized state.

8. The method according to claim 1, further comprising controlling at least one actuator to adjust a setting of a seatpost.

9. The method according to claim 1, wherein the sensor includes an Inertial Measurement Unit (IMU).

10. The method according to claim 9, wherein the IMU comprises at least one of an accelerometer, a gyroscope and a magnetometer.

11. The method according to claim 1, further comprising a Human Machine Interface (HMI) connected to the control unit.

12. The method according to claim 11, wherein the HMI presents information about current ride state.

13. The method according to claim 11, wherein the HMI device is interactive and can be used to adjust the system.

14. A bicycle suspension system comprising at least one of a front shock absorber and a rear shock absorber, at least one actuator for adjusting a setting of at least one of the front shock absorber and the rear shock absorber and a control system configured to control the bicycle suspension system according to the method of claim 1.

15. The bicycle suspension system according to claim 14, wherein said actuator is only energized during a change of setting of the at least one of the front shock absorber and the rear shock absorber and wherein said actuator is arranged to maintain its position in a non-energized state.

* * * * *